United States Patent
Smith et al.

(10) Patent No.: US 7,621,011 B2
(45) Date of Patent: Nov. 24, 2009

(54) PET NAIL TRIMMER INCLUDING A NAIL CLIPPER AND A GRINDER

(75) Inventors: Brian W. Smith, Janesville, WI (US); Michael Eddinger, Rock Falls, IL (US)

(73) Assignee: Wahl Clipper Corporation, Sterling, IL (US)

( * ) Notice: Subject to any disclaimer, the term of this patent is extended or adjusted under 35 U.S.C. 154(b) by 0 days.

(21) Appl. No.: 11/963,210

(22) Filed: Dec. 21, 2007

(65) Prior Publication Data
US 2009/0158593 A1    Jun. 25, 2009

(51) Int. Cl.
  *B26B 17/00* (2006.01)
  *A45D 29/02* (2006.01)
  *A01K 13/00* (2006.01)
(52) U.S. Cl. .................. 7/162; 30/28; 911/610
(58) Field of Classification Search ........ 7/162, 7/130, 131, 133–135; 30/26–29, 124, 233; 119/600, 608–610
See application file for complete search history.

(56) References Cited

U.S. PATENT DOCUMENTS

| | | | | | |
|---|---|---|---|---|---|
| 1,474,799 | A | * | 11/1923 | Starkey | 30/233 |
| 2,248,359 | A | * | 7/1941 | Klopfenstein | 362/119 |
| 4,943,047 | A | * | 7/1990 | Noble | 482/49 |
| 5,420,767 | A | * | 5/1995 | Jones | 362/109 |
| 2006/0042559 | A1 | * | 3/2006 | Kang | 119/600 |
| 2006/0158871 | A1 | * | 7/2006 | Hopkins et al. | 362/119 |
| 2007/0137041 | A1 | * | 6/2007 | Manheimer et al. | 30/29 |

* cited by examiner

*Primary Examiner*—Hadi Shakeri
(74) *Attorney, Agent, or Firm*—Greer, Burns & Crain, Ltd.

(57) ABSTRACT

A pet nail trimmer including a first cutting member and a second cutting member pivotably connected to the first cutting member. The first and second cutting members define an opening and are movable between an open position to receive a pet's nail in the opening and a closed position to cut the pet's nail. The nail trimmer also includes a grinder movably attached to one of the first and second cutting members, a motor connected to the grinder and mounted to the one of the first and second cutting members, and a power source mounted to the other of the first and second cutting members, where the power source is connected to the electric motor.

16 Claims, 4 Drawing Sheets

PET NAIL TRIMMER INCLUDING A NAIL CLIPPER AND A GRINDER

BACKGROUND OF THE INVENTION

The present application relates to nail trimmers, and more particularly, to nail trimmers for pets.

Routine trimming of a pets' nails is important not only for grooming purposes but for the health of the pet. A pet's nails, such as a dog's or a cat's nails, grow quickly and must be trimmed once or twice a month. Otherwise, untrimmed nails can lead to a variety of health problems. For example, long nails can break, be painful and bleed. In extreme circumstances, dogs' nails may actually curl and grow into their paw. For these reasons, there are several types of nail trimmers available for trimming pets' nails.

One type of pet nail trimmer has opposable handles that when squeezed together, cause a narrow blade to slide across an opening. A pet's nail is positioned in the opening and the blade cuts the nail to a desired length.

Another type of pet nail trimmer looks and operates similar to a pair of scissors. These nail trimmers include opposable cutting surfaces, each attached to a handle. A pet's nail is inserted in a space between the cutting surfaces to cut the nail to a desired length. Similar to a pair of scissors, the handles are squeezed together to cause the cutting surfaces to move together and cut the nail.

Nail grinders are pet grooming tools that grind down a sharp edge or sharp point of a pet's nail after the nail has been cut. The grinders are also used in place of nail clippers/trimmers, to grind down a pet's nail to a desired length. These nail grinders typically include a relatively hard grinding surface that is rotated by an electric motor at a high rate of speed. The grinding surface is moved into contact with the pet's nail and grinds away portions of the nail.

International Application No. WO 02/051242 to Kang discloses a safety nail clipper for pets having a nail clipper and a nail grinder. The nail clipper in Kang has a body that includes a nail clipper at one end and a motorized ceramic ball for grinding pets' nails on an opposing end. A narrow handle is pivotally connected to the body and is squeezed to cause upper and lower shearing edges to cut a pet's nail. Although Kang discloses a single tool having a nail clipper and nail grinder, the handle is relatively thin and does not enable a user to easily grasp the handle and body to squeeze the handle to clip a pet's nail. Also, the thinness of the handle makes it susceptible to bending or breaking during use. Furthermore, storing the battery, motor and grinding ball all in the body significantly reduces the amount of space available for other components of the nail clipper such as a spring, wiring and other parts. It also causes the body to have a larger size and shape, which makes grasping and manipulating the nail clipper more difficult.

Accordingly, there is a need for an improved pet nail trimmer that provides a nail clipper and a nail grinder in a single tool and enables a user to quickly and easily grasp and manipulate the nail trimmer to trim pets' nails.

SUMMARY OF THE INVENTION

The above-listed needs are met or exceeded by the present pet nail trimmer, which features a pair of opposable, hollow handles which each have a smaller, ergonomic shape to allow a user to easily grasp and manipulate the handles to cut a pet's nail. Additionally, the hollow handles of the present nail trimmer provide more space than conventional nail trimmers for storing different components of the nail trimmer. In the preferred embodiment, the present nail trimmer includes both a nail clipper and a nail grinder, which saves time and money over buying and using a separate nail clipper and nail grinder. Also, the nail grinder of the present nail trimmer is removable and replaceable to accommodate grinders having different sizes and shapes to cut nails having different sizes and shapes. Further, the preferred embodiment includes a movable shield positioned next to the nail grinder that enables a user to move the shield to a desired position to deflect or block the ground portions of a pet's nail.

More specifically, the present pet nail trimmer includes a first cutting member and a second cutting member pivotably connected to the first cutting member. The first and second cutting members define an opening and are movable between an open position to receive a pet's nail in the opening and a closed position to cut the pet's nail. The nail trimmer also includes a grinder movably attached to one of the first and second cutting members, a motor connected to the grinder and mounted to the one of the first and second cutting members, and a power source mounted to the other of the first and second cutting members, where the power source is connected to the electric motor.

DETAILED DESCRIPTION OF THE DRAWINGS

DETAILED DESCRIPTION OF THE INVENTION

Figure 1:
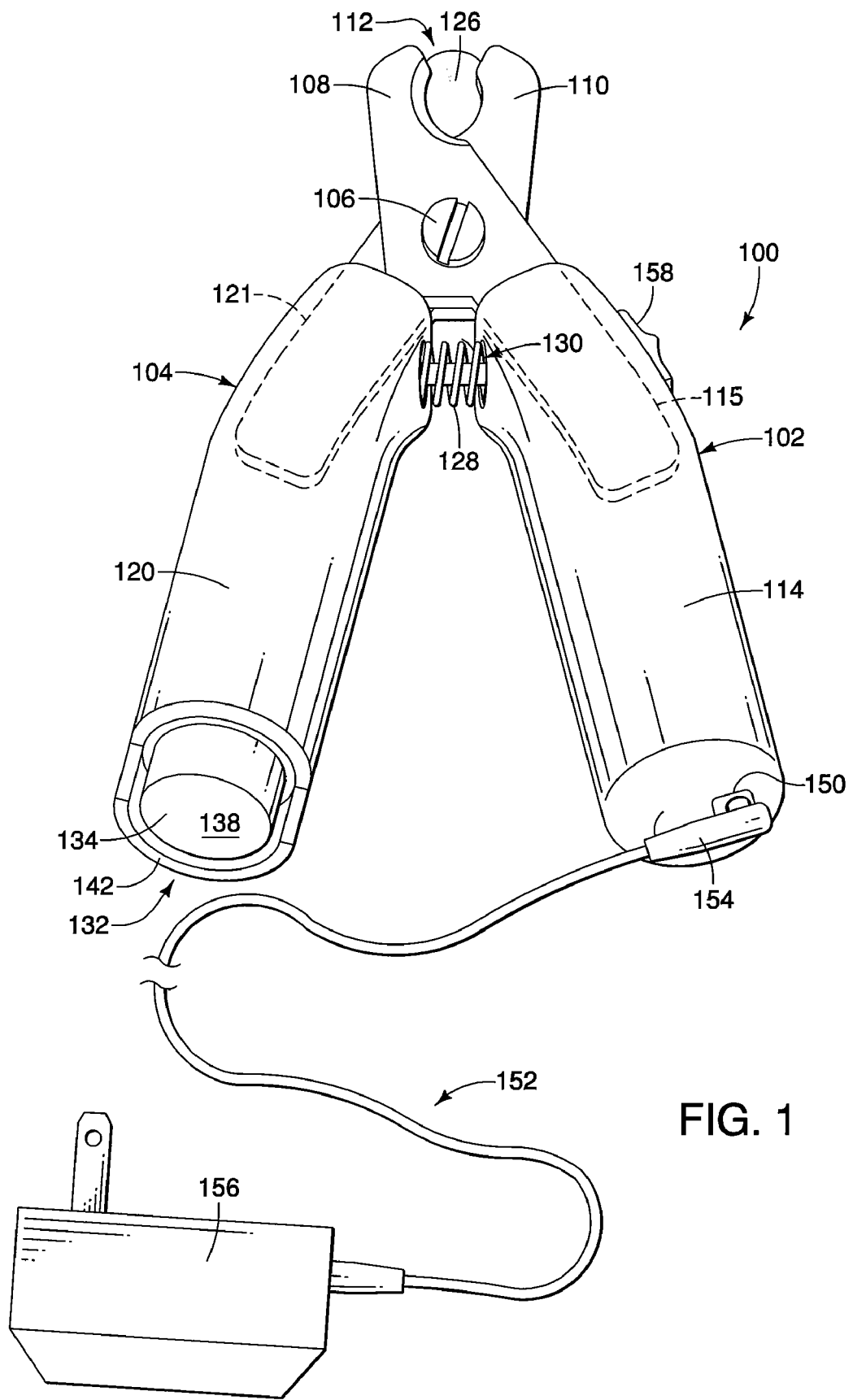
FIG. 1 is a perspective view of an embodiment of the present pet nail trimmer shown in the open position.

Referring now to FIGS. 1-7, a pet nail trimmer is provided and generally designated 100. The nail trimmer 100 generally includes a first cutting member 102 and a second cutting member 104 that are pivotally connected together using a fastener 106. The first and second cutting members 102, 104 respectively include cutting surfaces or blades 108 and 110 at one end. At an opposite end to the cutting blades 108, 110, the cutting members 102, 104 include bent arms 115, 121, respectively (shown in FIGS. 1, 2 and 4) and attach to handles as described below. The cutting members 102, 104, and more specifically, the cutting blades 108, 110, define an opening, gap or space 112 for receiving a pet's nail. The cutting members 102, 104 and the cutting blades 108, 110 are preferably made out of metal such as stainless steel. It is contemplated that the cutting members 102, 104 and cutting blades 108, 110 may be made out of any suitable material or combination of materials.

Figure 7:
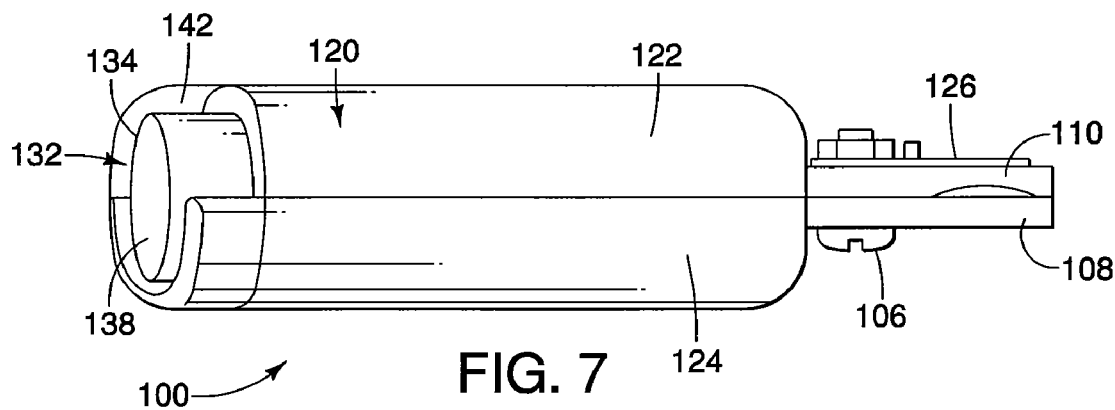
FIG. 7 is a bottom view of the pet nail trimmer of FIG. 1.

In the illustrated embodiment, each of the first and second cutting members 102 and 104 includes a hollow, handle made up of two handle portions. Specifically, the first cutting member 102 includes a first handle 114 having first handle portions 116, 118 (FIG. 6) and the second cutting member 104 includes a second handle 120 having second handle portions 122, 124 (FIG. 7). In the illustrated embodiment, cutting members 102, 104 include bent arms 115, 121 that are attached to an inside surface of the first and second handles 114, 120, and more specifically, to handle portions 118 and 122, respectively. This configuration saves space inside the handles for storing components of the nail trimmer as described in more detail below.

Each set of handle portions 116, 118 and 122, 124 is connected together using interlocking tabs or other suitable connectors or fasteners to form the handles 114, 120. The handles 114, 120 are preferably made from a durable material such as metal, plastic or any suitable material or combination of materials. In an embodiment, one or both handles 114, 120 include a grip (not shown) having one or more finger indentations to enable the handles to be easily grasped by a user. It is also contemplated that at least a portion of the handles 114, 120 may be covered by a compressible, slip resistant material such as rubber or the like.

Each of the handles 114, 120 defines an interior compartment or space for storing different components of the nail trimmer 100. By having two handles with interior compartments, the nail trimmer 100 has more space for storing the components of the nail trimmer. Also, the extra storage space allows the handles 114, 120 to have a smaller, ergonomic shape that makes grasping and manipulating the handles easier for a user.

In the illustrated embodiment, a guard 126 is pivotally attached to the first and second cutting members 102, 104 by the fastener 106. The guard 126 is positioned over the opening 112 in the safety position shown in FIG. 4 to act as a depth guard for preventing injury to an animal resulting from inadvertently cutting into the blood-filled "quick" of the nail. The pet nail inserted into the opening 112 can only project to the guard 126, thus providing a more consistent depth of cut. To temporarily hold the guard 126 in place, the guard 126 includes a detent 127 that engages a corresponding recess 129 (shown in phantom in FIG. 4) in cutting member 104.

A bias member such as coil spring 128 is attached at one end to the first handle 114 and at a corresponding end to the second handle 120 for biasing the first and second cutting members 102, 104 to the rest or open position shown in FIG. 1. Preferably, the spring 128 is sized to define an elongated opening 130 that allows one or more electrical connectors such as one or more electrical wires to extend through the elongated opening and connect components stored in the first and second handles as described in detail below.

Referring now to FIGS. 1-3 and 5, a grinder 132 is attached to either one of the first and second handles 114, 120 of the nail trimmer 100. The grinder 132 is preferably rotatably attached to the second handle 120. In the illustrated embodiment, the grinder 100 includes a head 134 and a shaft 136 attached to the head. The head 134 has a generally cylindrical shape and includes a first, generally planar grinding surface 138 and a second, annular or peripheral grinding surface 140. At least a portion of the first and second grinding surfaces 138, 140 is exposed to allow a pet's nail to contact each of the surfaces. The first and second grinding surfaces 138, 140 are made of a durable material that is generally harder than a pet's nail to facilitate grinding of the pet's nail.

A shield 142 is positioned adjacent to the grinder 132 and is movable to different positions relative to the grinder. The shield 142 deflects or blocks the portions of a pet's nail that are ground away by the grinder 132 and thereby helps to prevent the nail portions from contacting or hitting a user. To allow a user to be able to grasp and remove the head 134 if necessary, the shield 142 has a generally semi-circular or arcuate shape and extends slightly less than half way around the head 134.

Figure 3:
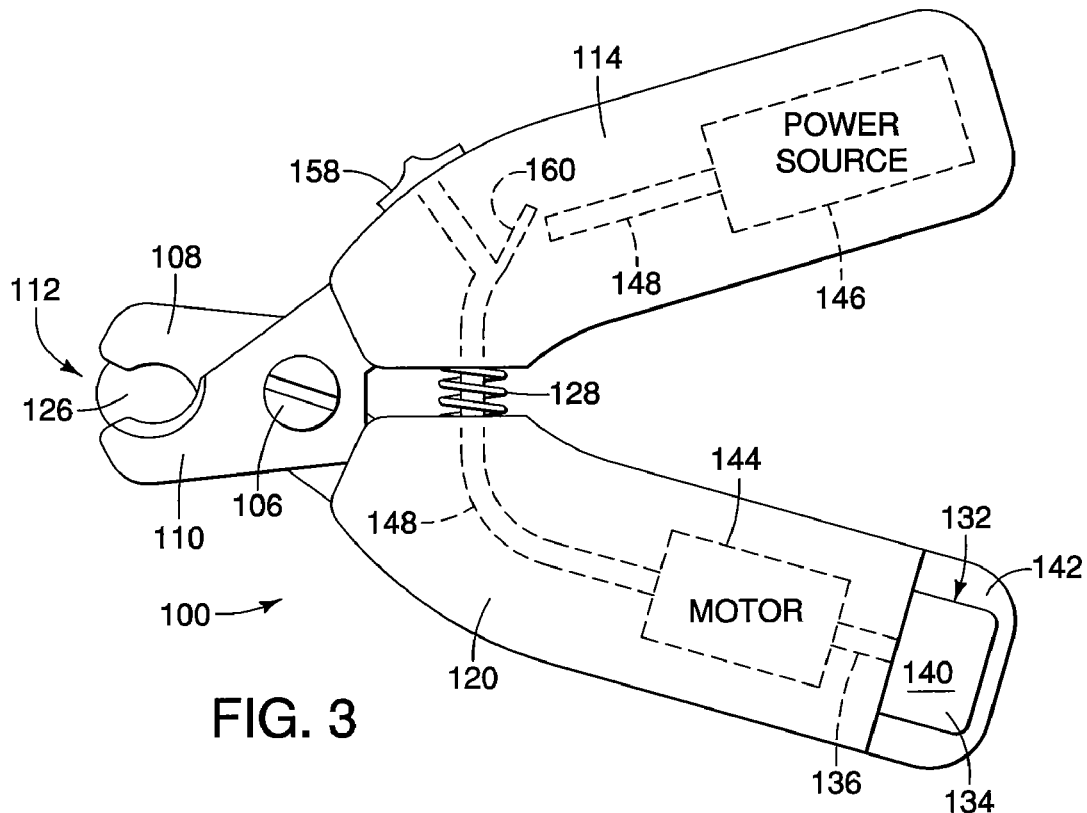
FIG. 3 is a left side view of the pet nail trimmer of FIG. 1.
Figure 4:
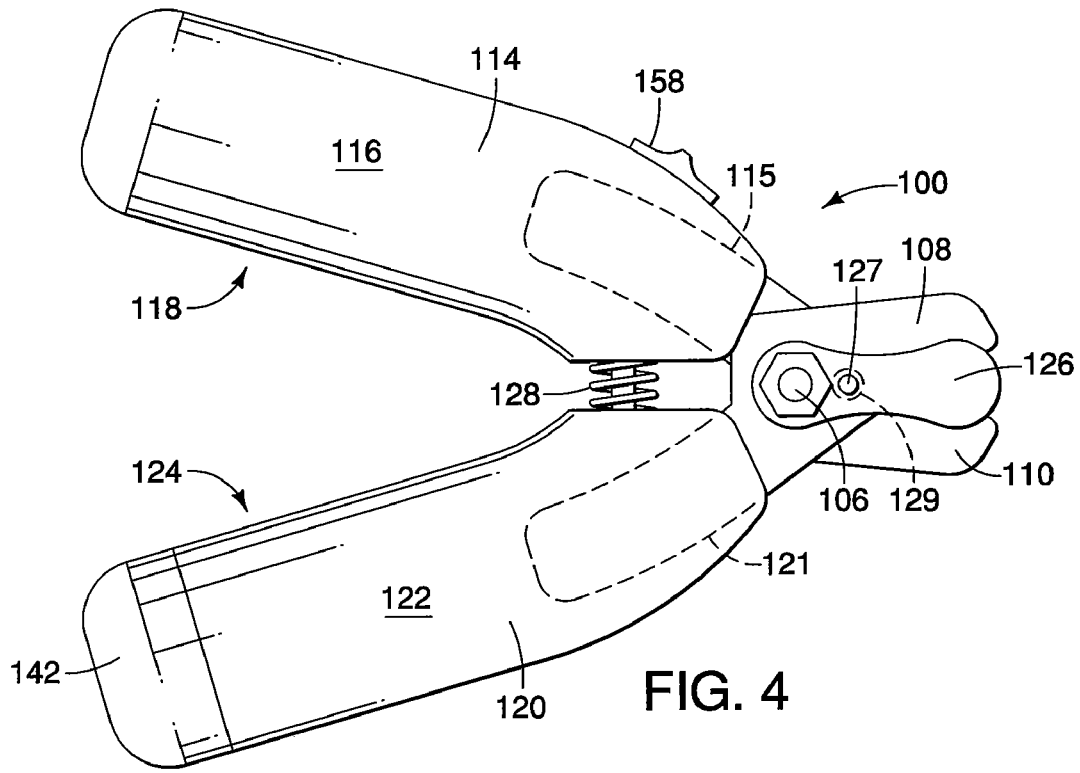
FIG. 4 is a right side view of the pet nail trimmer of FIG. 1.
Figure 5:
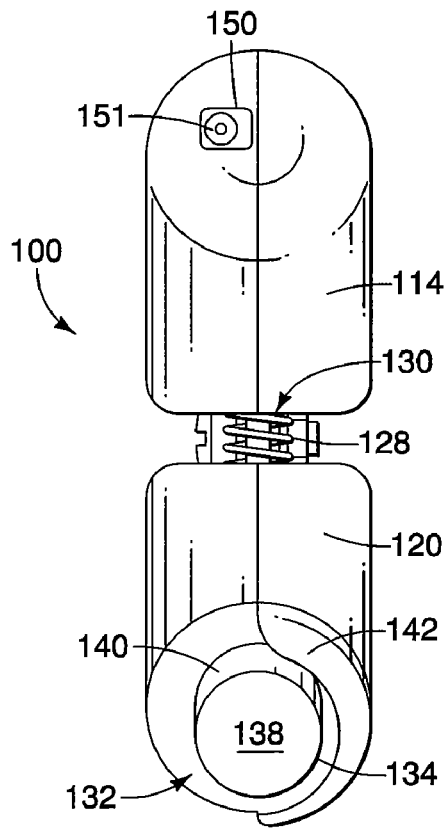
FIG. 5 is a rear end view of the pet nail trimmer of FIG. 1.
Figure 6:
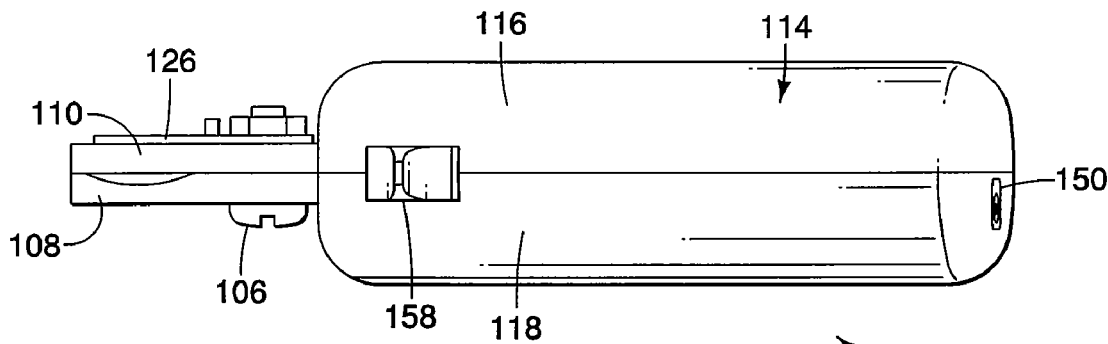
FIG. 6 is a top view of the pet nail trimmer of FIG. 1.

A motor 144, such as electric motor shown in FIG. 3, is mounted inside the second handle 120 and is connected to the grinder 132. Specifically, the motor 144 is connected to the shaft 136 of the grinder. The motor 144 rotates the shaft 136, which in turn, rotates the head 134. It should be appreciated that any suitable motor may be used to rotate the head 134. It should also be appreciated that the grinder 132 and the motor 144 may be attached to the first handle 114 or the second handle 120 of the nail trimmer 100. In the illustrated embodiment, the grinder 132 is removable and replaceable with an identical grinder or a different grinder selected from a plurality of grinders having different sizes. This enables a user to be able to adjust the size of the grinder or change to a different grinder having different grinding surfaces, such as harder grinding surfaces or coarser grinding surfaces, for grinding down different sizes and types of nails.

A power source 146 is mounted in the first handle 114, which is the handle opposite to the handle including the grinder 132 and the motor 144. The power source 146 is electrically connected to the motor 144 using a suitable electrical wire or wires 148. Specifically, one end of an electrical wire 148 is connected to the power source and an opposite end of the wire is threaded through the elongated opening 130 of the coil spring 128 and connected to the motor 144. Threading the electrical wire 148 through the coil spring 128 enables the first and second handles 114, 120 to move between the open and closed positions without damaging or severing the wire. In an embodiment, the electrical wire 148 is heat shrunk, wrapped or coated with an electrically insulated, rubberized material or other suitable material to protect the wire from being damaged by the movement of the handles 114, 120 or the spring 128, or from shorting out. Mounting the power source 146 in a different one of the handles 114, 120 from the grinder 132 and motor 144 provides more space for other components of the nail trimmer 100. Additionally, the first and second handles 114, 120 have a smaller, ergonomic shape, as described above, that makes the handles easier to grasp and manipulate. In an embodiment, the power source 146 includes one or more disposable or rechargeable batteries.

In a preferred embodiment, the power source 146 is replaceable by removing one of the handle portions 116, 118 described above. Alternatively, one of the handle portions 116, 118 may include an access door or panel that is removable to access the power source 146.

Figure 2:
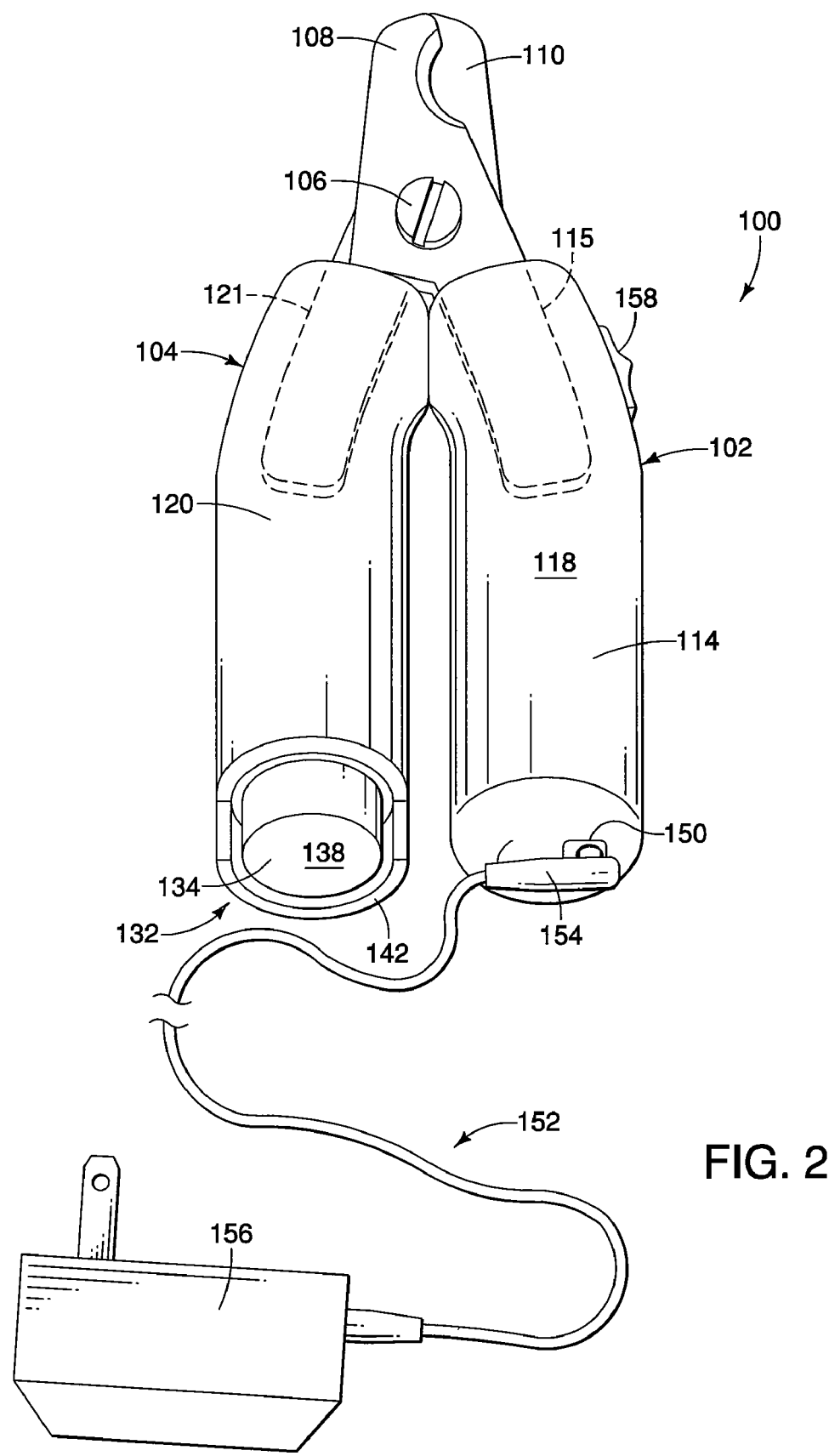
FIG. 2 is a perspective view of the pet nail trimmer of FIG. 1 shown in the closed position.

Referring to FIGS. 2 and 3, for re-charging the batteries in the power source 146, a power jack 150 is connected to the first handle 114 and is electrically connected to the power source via a suitable electrical connector such as an electrical wire. A power cord 152 having a male connector 154 and a plug 156 is connected to the nail trimmer 100 to provide electrical power to the power source 146 of the nail trimmer 100 from a conventional electrical outlet. Specifically, the plug 156 is connected to the electrical outlet and the male connector 154 is connected to the female receptacle 151.

A switch 158 is movably attached to the first handle 114 and is electrically connected to the power source 146 using a suitable electrical wire or wires. Specifically, the switch 158 controls the operation of connector 160 to enable a user to turn the power "on" and "off" to the nail trimmer 100. It should be appreciated that the switch 158 may be any suitable switch, button or other electrical control.

In operation, a user grasps the first and second handles 114, 120 of the nail trimmer 100. The relatively small size and ergonomic shape of the handles 114, 120 allows the user to comfortably and securely grasp the handles. A pets' nail is inserted at least partially into the opening or gap 112 defined between the first and second blades 108, 110. The user then squeezes the first and second handles 114, 120 together, causing the first and second cuffing members 102, 104, and more specifically, the first and second blades 108, 110, to move together to the closed position shown in FIG. 2. As the first and second blades 108, 110 move together, the blades cut the pet's nail to the desired length. Upon release of the pressure on the first and second handles 102, 104, the spring 128 biases the first and second cutting members 102, 104 away from each other until the first and second cutting members reach the open position.

After the pet's nail is cut, the user may either cut another of the pet's nails or grind down the rough edges of the nail that has been cut using grinder 132. To grind down the pet's nail, the user moves the switch 158 to the "ON" position whereby the motor 144 rotates the shaft 136 and head 134. One or more of the pet's nails are moved into contact with the first or second grinding surfaces 138, 140 of the rotating head 134 shield 142 is moved to any suitable position. To help deflect or block the ground portions of the nail, the user moves the shield to be on the side of the grinder 132 nearest the user. When the user is finished grinding the pet's nail or nails, the user moves the switch 158 to the "OFF" position to deactivate the motor 144 and stop the grinder head 134.

The present pet nail trimmer 100 enables a user to clip and grind a pet's nail using only one tool. This saves time by not having to search for more than one grooming tool. Also, the present pet nail trimmer saves money because multiple grooming tools do not have to be purchased. Furthermore, separately mounting the motor and power source in different handles saves space and allows the nail trimmer to have handles having a smaller, ergonomic shape that is easy to grasp and manipulate. The smaller size and shape of the handles also enables a user to securely grasp the handles and provide a significant squeezing force on the handles to enhance the cutting operation of the nail trimmer. Additionally, the moveable shield allows the user to move the shield to a desired location to help deflect or block more of the ground nail particles generated during the grinding of a pet's nail.

While several particular embodiments of the present pet nail trimmer including a pet nail clipper and a nail grinder have been shown and described, it will be appreciated by those skilled in the art that changes and modifications may be made thereto without departing from the invention in its broader aspects and as set forth in the following claims.

What is claimed is:

1. A pet nail trimmer comprising:
   a first cutting member;
   a second cutting member pivotably connected to said first cutting member, said first and second cutting members respectively including first and second handles each of said first and second handle defining an aperture, said cutting members defining an opening, and being movable between an open position to receive a pet's nail in said opening and a closed position to cut the pet's nail;
   a biasing member including a first end connected to said first handle and a second end connected to said second handle at said apertures respectively, said biasing member defining an elongated opening between said first end and said second end and configured to bias said first and second cutting members to said open position;
   a grinder movably attached to one of said first and second cutting members;
   a motor electrically connected to said grinder and mounted to said one of said first and second cutting members in a corresponding one of said first and second handles; and
   a power source mounted to another of said first and second cutting members, said power source is mounted in a different one of said first and second handles from said motor, said power source being electrically connected to said electric motor, wherein one end of an electrical connector is connected to the power source and an opposite end of said connector is connected to said motor and wherein said electrical connector extends through said apertures and said elongated opening of said biasing member.

2. The pet nail trimmer of claim 1, wherein at least one of said first and second handles includes a grip.

3. The pet nail trimmer of claim 1, further comprising a shield positioned adjacent to said grinder and attached to said one of said first and second cutting members.

4. The pet nail trimmer of claim 1, further comprising a movable shield positioned adjacent to said grinder and attached to said one of said first and second cutting members.

5. The pet nail trimmer of claim 1, wherein said bias-biasing member is a coil spring.

6. The pet nail trimmer of claim 1, wherein said grinder includes two grinding surfaces.

7. The pet nail trimmer of claim 1, wherein at least one of said first and second cutting members includes a grip.

8. The pet nail trimmer of claim 1, further comprising a nail guard pivotally attached to said first and second cutting members.

9. A pet nail trimmer comprising:
   a pair of opposing cutting members pivotally connected together, said cutting members defining an opening therebetween and being movable between an open position to receive a pet's nail in said opening and a closed position to cut the pet's nail;
   a nail guard pivotally attached to said first and second cutting members;
   a first handle and a second handle, each of said first and second handle being at least partially hollow and attached to one of said cutting members and each of said first and second handle defining an aperture;
   a biasing member including a first end connected to said first handle and a second end connected to said second handle at said apertures respectively, said biasing member defining an elongated opening between said first end and said second end and configured to bias said first and second cutting members to said open position;
   a grinder attached to one of said first and second handles;
   a motor electrically coupled to said grinder and mounted to said one of said first and second cutting members in a corresponding one of said handles;
   a power source mounted to another of said first and second cutting members, said power source is mounted inside a different one of said first and second handles from said motor; said power source being electrically connected to said electric motor, wherein a first end of an electrical connector is connected to said power source and an opposite second end of said connector is connected to said motor, said electrical connector extending through said apertures and said elongated opening of said biasing member;
   said first and second handles each having two opposite ends, a first one of said two ends is closest to said cutting members and a second one of said two ends is closest to said grinder;
   and said power source and said motor are each disposed in a corresponding one of said first and second handles closer to a corresponding one of said second ends.

10. The pet nail trimmer of claim 9, wherein at least one of said first and second handles includes a grip.

11. The pet nail trimmer of claim 9, further comprising a shield positioned adjacent to said grinder and attached to said one of said first and second handles.

12. The pet nail trimmer of claim 9, further comprising a movable shield positioned adjacent to said grinder and attached to said one of said first and second handles.

13. The pet nail trimmer of claim 9, wherein said grinder includes two grinding surfaces.

14. The pet nail trimmer of claim 9, wherein said first and second handles each further include first and second handle portions, said first and second handle portions of said first handle enclosing said power source, and said first and second handle portions of said second handle enclosing said motor.

15. A pet nail trimmer comprising:
- a pair of opposing cutting members pivotally connected together, said cutting members defining an opening therebetween and being movable between an open position to receive a pet's nail in said opening and a closed position to cut the pet's nail;
- a nail guard pivotally attached to said first and second cutting members, said nail guard extending over said opening defined between said cutting members;
- a first handle and a second handle, each of said first and second handle being at least partially hollow and attached to one of said cutting members and each of said first and second handle defining an aperture;
- a biasing member disposed between said first and second handles said biasing member including a first end connected to said first handle and a second end connected to said second handle at said apertures respectively, for biasing said cutting members to said open position;
- a grinder attached to one of said first and second handles;
- a motor electrically coupled to said grinder and mounted to said one of said first and second cutting members in a corresponding one of said handles, said motor being located in said handle closer to said grinder than to said cutting member; and
- a power source mounted to another of said first and second cutting members, said power source is mounted inside a different one of said first and second handles from said motor; said power source being located closer to an end of said handle adjacent said grinder than to said cutting member, said power source being electrically connected to said electric motor, wherein one end of an electrical connector is connected to the power source and an opposite end of said connector is threaded through said apertures and an opening of said biasing member and connected to said motor.

16. The pet nail trimmer of claim 15, wherein said first and second handles each further include first and second handle portions, said first and second handle portions of said first handle enclosing said power source, and said first and second handle portions of said second handle enclosing said motor.

\* \* \* \* \*